(12) United States Patent
Ramlaoui

(10) Patent No.: US 10,280,959 B2
(45) Date of Patent: May 7, 2019

(54) SLIDING FASTENER SYSTEMS TO ACCOMMODATE DIFFERENTIAL THERMAL GROWTH

(71) Applicant: ROHR, INC., Chula Vista, CA (US)

(72) Inventor: Jihad Ramlaoui, Chula Vista, CA (US)

(73) Assignee: ROHR, INC., Chula Vista, CA (US)

(*) Notice: Subject to any disclaimer, the term of this patent is extended or adjusted under 35 U.S.C. 154(b) by 357 days.

(21) Appl. No.: 15/209,472

(22) Filed: Jul. 13, 2016

(65) Prior Publication Data

US 2018/0016019 A1 Jan. 18, 2018

(51) Int. Cl.
*F16B 5/06* (2006.01)
*B64D 29/00* (2006.01)
*F16B 1/00* (2006.01)

(52) U.S. Cl.
CPC ............ *F16B 5/0628* (2013.01); *B64D 29/00* (2013.01); *F16B 2001/0078* (2013.01)

(58) Field of Classification Search
CPC ... B64C 1/40; B64D 29/06; F16B 5/02; F16B 13/06; F16B 37/04
See application file for complete search history.

(56) References Cited

U.S. PATENT DOCUMENTS

| | | | | |
|---|---|---|---|---|
| 3,640,327 A | * | 2/1972 | Burt | F16B 5/02 411/108 |
| 4,193,435 A | * | 3/1980 | Frosch | F16B 37/044 411/103 |
| 4,830,557 A | * | 5/1989 | Harris | F16B 37/044 411/112 |
| 5,497,616 A | * | 3/1996 | Roberts | F16B 5/02 403/28 |
| 6,543,916 B2 | | 4/2003 | Shirai | |
| 6,607,165 B1 | | 8/2003 | Manteiga et al. | |
| 6,637,993 B2 | * | 10/2003 | Murakami | F16B 5/0208 411/112 |
| 7,441,996 B2 | | 10/2008 | Odulio et al. | |
| 7,789,605 B2 | * | 9/2010 | Kidman | F16B 19/109 411/34 |
| 7,849,696 B2 | | 12/2010 | De Sousa et al. | |
| 2008/0178465 A1 | * | 7/2008 | Schiavo | F01D 25/246 29/889.21 |
| 2018/0029688 A1 | * | 2/2018 | Connelly | B64C 1/40 |
| 2018/0216644 A1 | * | 8/2018 | Mateo | B64F 5/10 |

* cited by examiner

*Primary Examiner* — Valentina Xavier
(74) *Attorney, Agent, or Firm* — Cantor Colburn LLP

(57) ABSTRACT

Sliding fastener systems can include a fastener configured to fixedly attach to a first component having a first thermal expansion coefficient, a tray configured to fixedly attach to a second component having a second thermal expansion coefficient different from the first thermal expansion coefficient, the tray defining a sliding surface, and at least a portion of a locking element configured to engage with the fastener, the locking element having a base with a contact surface that movably contacts the sliding surface of the tray when the tray, the fastener, and the locking element fasten the first component and the second component together. The fastener and the locking element are configured to move with the first component and the tray is configured to move relative to the fastener and the locking element with the second component when there is a differential thermal expansion between the first and second components.

20 Claims, 5 Drawing Sheets

SLIDING FASTENER SYSTEMS TO ACCOMMODATE DIFFERENTIAL THERMAL GROWTH

BACKGROUND

The subject matter disclosed herein generally relates to fasteners and, more particularly, to sliding fastener systems.

Joining components subject to differential thermal growth presents challenges, particularly in demanding aerospace applications. Differential thermal growth between two components may occur as a result of thermal gradients between two joined parts (e.g., one part is hotter than the other) or as a result of different rates of thermal expansion between the materials in the two components. One challenge is the accommodation of the different thermal growths at the interface between the components without creating large loads and high stresses. For example, in an aerospace application, aluminum strakes may be attached to composite fan cowls. When the aircraft is in cruise at high altitudes and subject to low ambient temperatures, the aluminum strake contracts at a much greater rate than the composite fan cowl. If the strake and the fan cowl are tightly clamped together and the joint completely restrained, then the differential growth will resolve into different types of loads and stresses in the strake, the fan cowl, and the fasteners that join them. The problem can be particularly acute in the fasteners between two joined components with differential thermal expansion, as the fasteners may suffer from fatigue if there are many cycles of expansion and contraction. In general, a preferred attachment philosophy in this type of situation is to allow the components to move relative to each other at the joint, at least partially (i.e., allow the thermal expansion be unrestrained or at least partially unrestrained), in order to avoid generating the large loads and high stresses. The attachment methodology described herein allows such movement, while still maintaining an overall sound fastener joint.

SUMMARY

According to one embodiment, a sliding fastener system is provided. The sliding fastener system includes a fastener configured to fixedly attach to a first component having a first thermal expansion coefficient, a tray configured to fixedly attach to a second component having a second thermal expansion coefficient different from the first thermal expansion coefficient, the tray defining a sliding surface, and a locking element having at least a portion configured to engage with the fastener, the locking element having a base with a contact surface that movably contacts the sliding surface of the tray when the tray, the fastener, and the locking element fasten the first component and the second component together. The fastener and the locking element are configured to move with the first component and the tray is configured to move relative to the fastener and the locking element with the second component when there is a differential thermal expansion between the first and second components.

In addition to one or more of the features described above, or as an alternative, further embodiments of the sliding fastener system may include two or more tray fasteners configured to fixedly attach the tray to the second component.

In addition to one or more of the features described above, or as an alternative, further embodiments of the sliding fastener system may include that the contact surface of the base includes a friction reducing feature such that the base can move relative to the sliding surface.

In addition to one or more of the features described above, or as an alternative, further embodiments of the sliding fastener system may include that the friction reducing feature is at least one of a material of the sliding surface, a material of the contact surface, a coating applied to the sliding surface, or a coating applied to the contact surface.

In addition to one or more of the features described above, or as an alternative, further embodiments of the sliding fastener system may include that the friction reducing feature is a curved contour of the base of the locking element.

In addition to one or more of the features described above, or as an alternative, further embodiments of the sliding fastener system may include that the tray includes a structural element that increases a structural rigidity of the tray.

In addition to one or more of the features described above, or as an alternative, further embodiments of the sliding fastener system may include that the structural element at least partly defines the sliding surface.

In addition to one or more of the features described above, or as an alternative, further embodiments of the sliding fastener system may include that the tray includes a tray aperture passing therethrough and configured to receive a portion of the fastener and the locking element includes a locking aperture passing therethrough, the locking aperture configured to engage with the fastener, and the locking aperture has a smaller diameter than the tray aperture.

In addition to one or more of the features described above, or as an alternative, further embodiments of the sliding fastener system may include that the portion of the locking element configured to engage with the fastener is a stem.

In addition to one or more of the features described above, or as an alternative, further embodiments of the sliding fastener system may include that the stem is separable from the base.

According to another embodiment, a sliding fastener system is provided that includes a first component having a first thermal expansion coefficient, a second component having a second thermal expansion coefficient different from the first thermal expansion coefficient, a fastener configured to pass through the first component and the second component and fixedly contact the first component, a tray configured to fixedly attach to the second component, the tray defining a sliding surface, and a locking element having at least a portion configured to engage with the fastener, the locking element having a base with a contact surface that movably contacts the sliding surface of the tray when the tray, the fastener, and the locking element fasten the first component and the second component together. The fastener and the locking element are configured to move with the first component and the tray is configured to move relative to the fastener and the locking element with the second component when there is a differential thermal expansion between the first and second components.

In addition to one or more of the features described above, or as an alternative, further embodiments of the sliding fastener system may include that the first component is a strake of an aircraft propulsion system and the second component is a composite shell of a nacelle of the aircraft propulsion system.

In addition to one or more of the features described above, or as an alternative, further embodiments of the sliding fastener system may include that the second component includes a component aperture passing therethrough and configured to receive a portion of the fastener, the tray includes a tray aperture passing therethrough and configured to receive a portion of the fastener, and the tray aperture is a smaller diameter than the component aperture.

In addition to one or more of the features described above, or as an alternative, further embodiments of the sliding fastener system may include at least one tray fastener configured to fixedly attach the tray to the second component.

In addition to one or more of the features described above, or as an alternative, further embodiments of the sliding fastener system may include that the contact surface of the base includes a friction reducing feature such that the base can move relative to the sliding surface.

In addition to one or more of the features described above, or as an alternative, further embodiments of the sliding fastener system may include that the friction reducing feature is at least one of a material of the sliding surface, a material of the contact surface, a coating applied to the sliding surface, or a coating applied to the contact surface.

In addition to one or more of the features described above, or as an alternative, further embodiments of the sliding fastener system may include that the friction reducing feature is a curved contour of the base of the locking element.

In addition to one or more of the features described above, or as an alternative, further embodiments of the sliding fastener system may include that the tray includes a tray aperture passing therethrough and configured to receive a portion of the fastener and the locking element includes a locking aperture, the locking aperture configured to engage with the fastener, and the locking aperture has a smaller diameter than the tray aperture.

In addition to one or more of the features described above, or as an alternative, further embodiments of the sliding fastener system may include that the tray includes a structural element that increases a structural rigidity of the tray.

In addition to one or more of the features described above, or as an alternative, further embodiments of the sliding fastener system may include that the structural element at least partly defines the sliding surface.

Technical effects of embodiments of the present disclosure include a sliding fastener system that can be used to fasten or otherwise join two components of differing thermal expansion coefficients and reduce in-plane loads of such a joining. Further technical effects include improved sliding through the inclusion of materials, coatings, etc. used to enable movement between a locking element and a tray of the sliding fastener system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
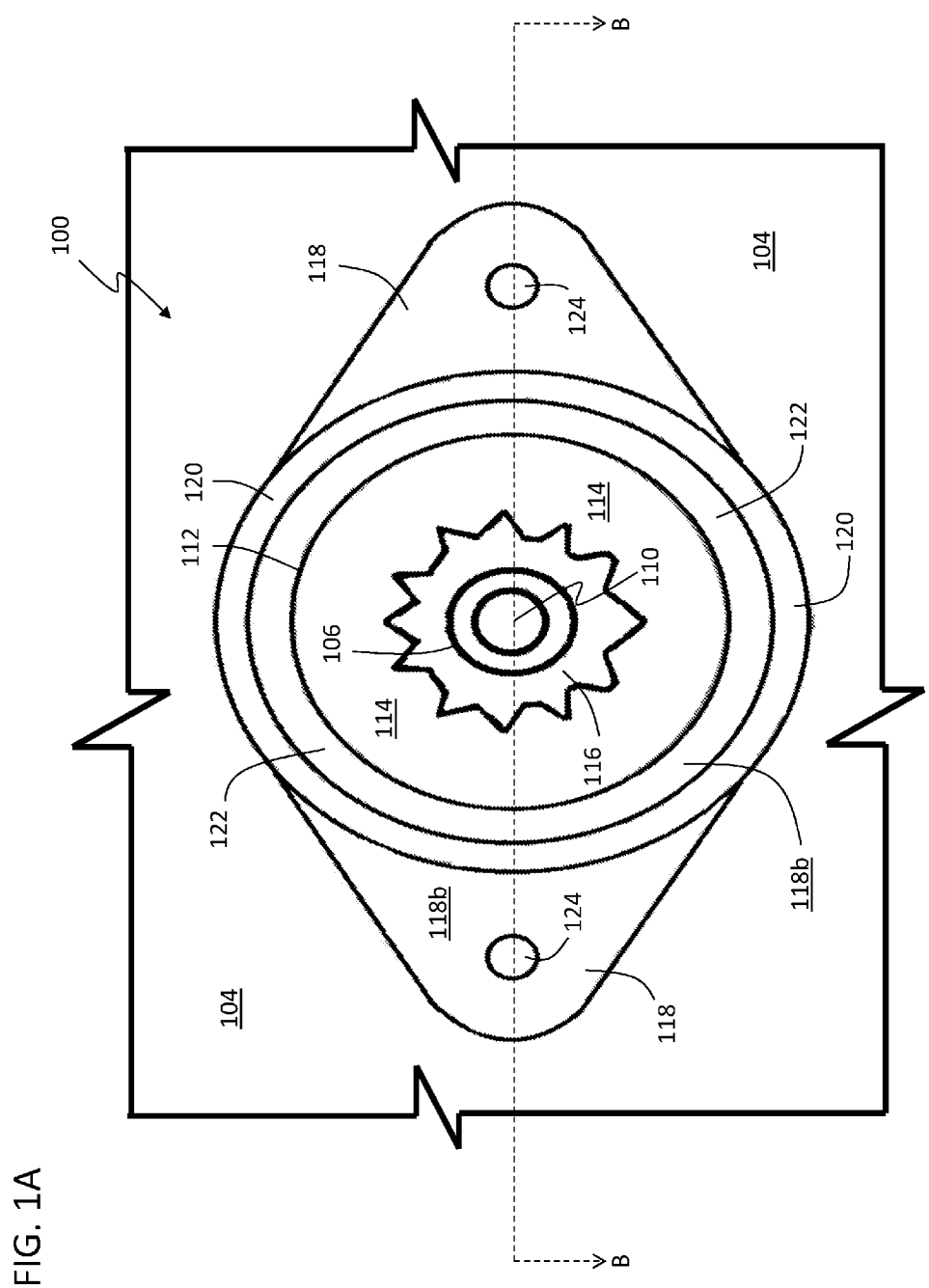
FIG. 1A illustrates a bottom up, plan view (as viewed from below in FIG. 1B and indicated by line A-A) of a sliding fastener system in accordance with an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

As provided herein, embodiments of the present disclosure are directed to improved fastening systems for components formed from dissimilar materials. Such improved fastening system can be used for applications and configurations that are subject to thermal changes and/or thermal gradients such that one of two joined components may expand or contract at a different rate than the other of the two joined components. That is, fastening systems as provided herein will find application in fastening two components that have different thermal expansion coefficients. In some embodiments, the fastening systems of the present disclosure may be used in aerospace applications, such as connections between strakes and fan cowls of propulsion systems on aircraft.

The strakes of such systems may be formed from aluminum whereas the fan cowls can be formed from composites. The aluminum components and the composite components have different thermal expansion coefficients, and thus relative movement between one of the components and a fastener may occur in response to a temperature change. The relative movement of the components may impart large in-plane loads on one or both components (or on the fasteners connecting the two) which can reduce a component life as compared to components not subject to such in-plane loads.

Accordingly, fastening systems configured to reduce, minimize, or eliminate in-plane loads that result from different thermal expansions at connections between dissimilar-material components are provided herein. Various embodiments of the present disclosure include a sliding nut arrangement that includes a nut (which may act as a slider) and a tray (which may act as a track for the slider). The material and shape of the nut is selected to provide for a controlled clamp or joining between two components as well as provide an appropriate footprint at a tray interface to minimize contact stresses/loads as well as facilitate sliding. The tray (track) material and shape is configured to provide for a stiff and unobstructed sliding surface for the nut to slide on. In some non-limiting embodiments, mating surfaces between the slider and track (e.g., contact surfaces between a nut and a tray) can be coated with low friction material in order to control the coefficient of friction. Advantageously, in accordance with embodiments of the present disclosure, fastener in-plane load is then a product of the coefficient of friction and a clamp-up force resulting from the applied torque.

Figure 1B:
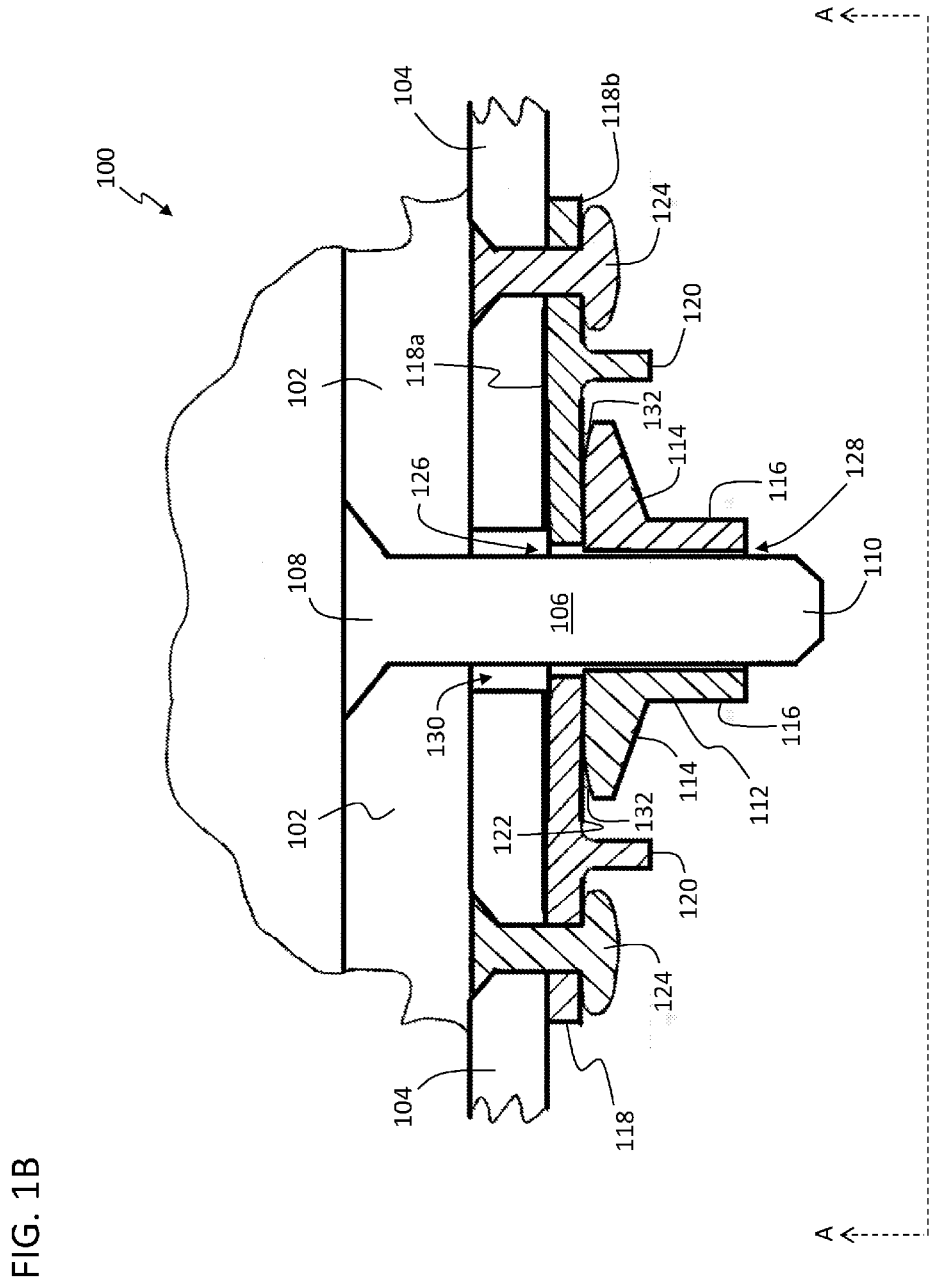
FIG. 1B illustrates a cross-sectional illustration of the sliding fastener system of FIG. 1A, as viewed along the line B-B of FIG. 1A.

Turning to FIGS. 1A-1B, schematic illustrations of a sliding fastener system 100 in accordance with a non-limiting embodiment of the present disclosure are shown. FIG. 1A illustrates a bottom up, plan view (as viewed from below in FIG. 1B, indicated by line A-A) of the sliding fastener system 100 and FIG. 1B illustrates a cross-sectional illustration as viewed along the line B-B of FIG. 1A. The sliding fastener system 100 is configured to join or otherwise attach or connect two components that have two different thermal expansion coefficients. For example, as shown in FIG. 1B a first component 102 is connected to a second component 104. The first component 102 has a different thermal expansion coefficient than the second component 104. For example, in one non-limiting example, the first component 102 may be an aluminum strake and the second component 104 may be a composite material cowl of an aircraft propulsion system.

The sliding fastener system 100 is configured to enable relative movement to accommodate different thermal expansion rates. For example, as shown, the sliding fastener system 100 includes a fastener 106 that extends from a first end 108 through the first component 102 and the second component 104 to a second end 110. The second end 110 is configured to engage with a locking element 112. The locking element 112, as shown, includes a base 114 and a stem 116. The stem 116 of the locking element 112 is configured to fixedly connect to the second end 110 of the fastener 106, such as by threaded engagement. In some embodiments, the locking element 112 is a threaded nut. Further, in some embodiments the stem 116 can be used for torquing the fastener 106. In alternative embodiments, the locking element 112 can be configured to securely engage with a fastener by other means, including but not limited to, interference fits, adhesives, glues, welding, chemical or mechanical bonding, etc. without departing from the scope of the present disclosure. Further, in some embodiments, the locking element 112 can be composed of multiple parts. For example, in some embodiments, the locking element 112 can be formed of a discrete or separate stem and a discrete or separate base. In such a configuration, the base may be engageable with the fastener or not, whereas the stem may be a nut or other locking feature that can clamp or otherwise secure the base between the locking feature and the tray.

The fastening system includes a tray 118 that is configured to contact the second component on a first side 118a of the tray 118. As shown in FIGS. 1A-1B, a second side 118b of the tray 118 includes an optional structural element 120 that defines a sliding surface 122 within the structural element 120. The sliding surface 122 of the tray 118 is a portion of the second side 118b of the tray 118 and is configured to contact the base 114 of the locking element 112. Accordingly, the tray 118 is partially retained between the second component 104 and the locking element 112. However, as described herein, the base 114 of the locking element 112 can be configured to slide, translate, or otherwise move relative to the tray 118 within the structural element 120 and on the sliding surface 122. In some embodiments, the structural element 120 can be provided and/or configured to increase the stiffness or structure rigidity of the tray 118. Further, in some embodiments, the structural element 120 can be omitted or take other configurations and/or geometries. In some such embodiments, a thickness of the tray 118 (e.g., a distance from the first side 118a to the second side 118b) may be sufficiently thick and thus be stiff enough for a desired application (e.g., to accommodate a desired torque) without structural element 120. In such embodiments, the sliding surface 122 of the tray 118 may not be explicitly defined by a feature such as the structural element 120. In some embodiments, the structural element does not extend in a complete circle, but rather may take the form of ridges, rails, etc., and thus the presently shown structural element 120 is not intended to be limiting.

As shown in FIG. 1B, the tray 118 is fastened or otherwise fixedly connected to the second component 104 by tray fasteners 124. The tray fasteners 124 can be rivets, bolts, screws, or other types of fasteners that can fixedly connect the tray 118 to the second component 104. Because of the fixed connection between the tray 118 and the second component 104, any movement of the second component 104 will cause the tray 118 to move in tandem.

Figure 2:
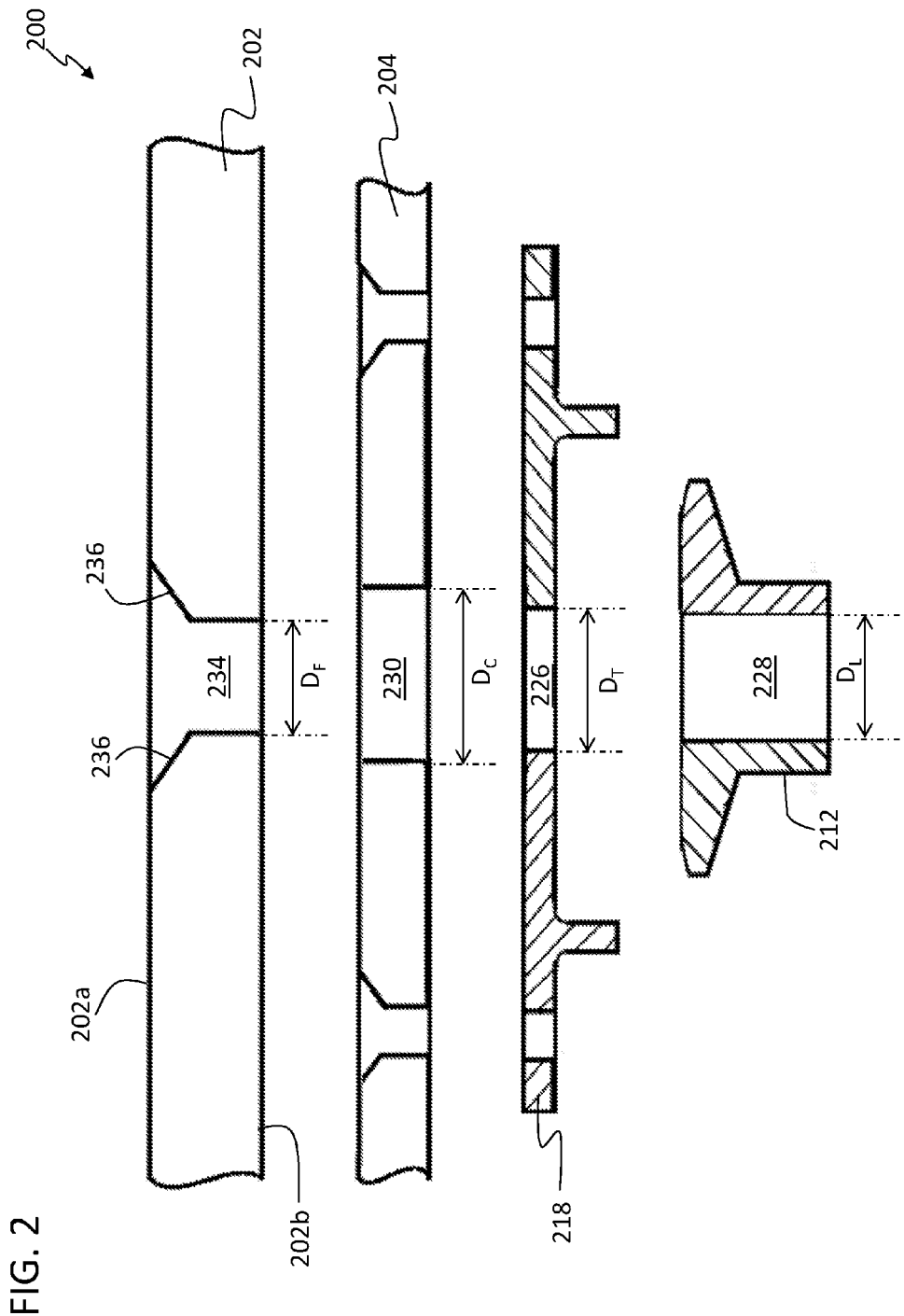
FIG. 2 is an exploded schematic illustration of a sliding fastener system in accordance with an embodiment of the present disclosure.

As shown in FIG. 1B, the tray 118 includes a tray aperture 126 that is sized to allow the fastener 106 to pass through the tray 118 with some amount of clearance. That is, the tray aperture 126 has an inner diameter that is larger than an external diameter of the fastener 106, and may be larger than a locking aperture 128 of the locking element 112 (e.g., as shown in FIG. 2 and described below). Further, as shown, the second component 104 includes a component aperture 130 that may have a larger internal diameter than the tray aperture 126. The difference in size of apertures (tray aperture 126 versus component aperture 130 and tray aperture 126 versus the locking aperture 128) allows for movement of the first component 102 relative to the second component 104 without the fastener 106 bottoming out on the second component 104 or the tray 118 which could result in high hard to manage in-plane loads. For example, advantageously, the sliding fastener system 100 can facilitate sliding of the fastener 106 (and locking element 112) to alleviate some or all of the potential rocking and/or bending of the fastener 106 that would otherwise occur relative to the first component 102. Such displacement (e.g., movement as compared to bending/rocking) can result in increased part life due to the elimination or minimization of stresses and stress cycles.

The result of the above described configuration and apertures is that the first component 102, the fastener 106, and the locking element 112 can move together relative to the second component 104 and the tray 118. Accordingly, when the first component 102 and the second component 104 have different thermal expansion coefficients, and thus will expand and contract at different rates, in-plane loads can be minimized, thus improving the life of the components 102, 104 and of the sliding fastener system 100, especially fastener 106.

Also shown in FIG. 1B is an optional feature of the locking element 112. As shown, the locking element 112 includes a contact surface 132 along the base 114. The contact surface 132 is configured to slide on the sliding surface 122 of the tray 118. The contact surface 132, in some embodiments and as shown, can be curved or otherwise contoured to improve the ability of the locking element 112 to move relative to the sliding surface 122. Further, in some embodiments, in combination with the curved surface or in the alternative, the contact surface 132 and/or the sliding surface 122 can be coated or otherwise configured to improve relative movement between the locking element 112 and the sliding surface 122. That is, embodiments provided herein enable controlling a coefficient of friction between the contact surface 132 and the sliding surface 122.

For example, in some embodiments, the contact surface 132 and/or the sliding surface 122 can include a friction reducing feature such as a material coating that is selected to reduce friction between the contact surface 132 and the sliding surface 122. In other embodiments, or in combination with coatings, the friction reducing feature can be provided by the material used to form one or both of the contact surface 132 (e.g., material of locking element 112) or the sliding surface 122 (e.g., material of tray 118) which can be selected to minimize a coefficient of friction. Further still, the friction reducing feature can be a mechanical mechanism for reducing the coefficient of friction. For example, bearings may be included in one or both of the base 114 or the tray 118. Further still, the friction reducing feature can be grease or other lubricant(s) that can be applied at the interface of the contact surface 132 and the sliding surface 122.

Turning now to FIG. 2, a schematic illustration of a sliding fastener system 200 as separated and without a fastener is shown. As shown in FIG. 2, a locking element 212 defines a locking aperture 228 extending therethrough. The locking aperture 228 can include threads or other features that enable engagement with a fastener (e.g., fastener 106), as described above. The locking aperture 228 has a locking aperture diameter $D_L$, which can be selected for fixed engagement with a fastener. Further, as shown in FIG. 2, the tray 218 includes a tray aperture 226 having a tray aperture diameter $D_T$. The tray aperture diameter $D_T$, as shown, is larger than the locking aperture diameter $D_L$. As such, the tray aperture diameter $D_T$ is a larger diameter than a fastener that engages with the locking element 212. The difference in diameters results in a gap between an exterior surface of the fastener and the wall of the tray aperture 226, and thus a freedom of movement of the fastener 106 is enabled.

Also shown in FIG. 2, a first component 202 has a fastener aperture 234 that is configured to receive a fastener (e.g., fastener 106) and has a fastener aperture diameter $D_F$. In some embodiments, the fastener aperture diameter $D_F$ may be sized to enable engagement with the fastener with an interference or transition fit, or sized with a sliding fit to allow the fastener to pass therethrough. Further, as shown, the fastener aperture 234 includes an optional tapered portion that defines a fastener engagement surface 236 on a first component first surface 202a. The fastener engagement surface 236 can be a tapered surface that is configured to receive a portion of the fastener and thus enable fixed and secure engagement and retention of the first component 202 to a second component 204. In other embodiments, the fastener engagement surface can be flat, such that the diameter of the fastener aperture 234 is constant and uniform from the first component first surface 202a to a first component second surface 202b. In such embodiments, the fastener that passes through the fastener aperture 234 may include a fastener head that protrudes or extends above the first component first surface 202a and engages with a portion of the first component first surface 202a that surrounds the fastener aperture 234. Those of skill in the art will appreciate that flush fastener heads (e.g., as shown in FIGS. 1B-2) may provide aerodynamic advantages. Further, those of skill in the art will appreciate that any fastener head arrangement and/or geometry can be used without departing from the scope of the present disclosure.

The second component 204 includes a component aperture 230, as described above. The component aperture 230 has a component aperture diameter $D_C$. As shown, the component aperture diameter $D_C$ is greater than the fastener aperture diameter $D_F$ and locking aperture diameter $D_L$. The increased diameter of the component aperture diameter $D_C$ allows for the fastener that passes through all apertures 226, 228, 230, 234 to move relative to the second component 204, and thus in-plane loads may not be carried by the fastener.

In the embodiments of FIGS. 1A-2, the tray aperture 226 has a smaller diameter (tray aperture diameter $D_T$) that is less than the diameter of the component aperture 230 (component aperture diameter $D_C$). Various other relative sizes of diameters of the apertures of the various components and elements are shown and described herein. However, those of skill in the art will appreciate that other diameter and relative diameter configurations are possible without departing from the scope of the present disclosure. That is, one internal diameter might be smaller than another, or they might be the same.

Figure 3:
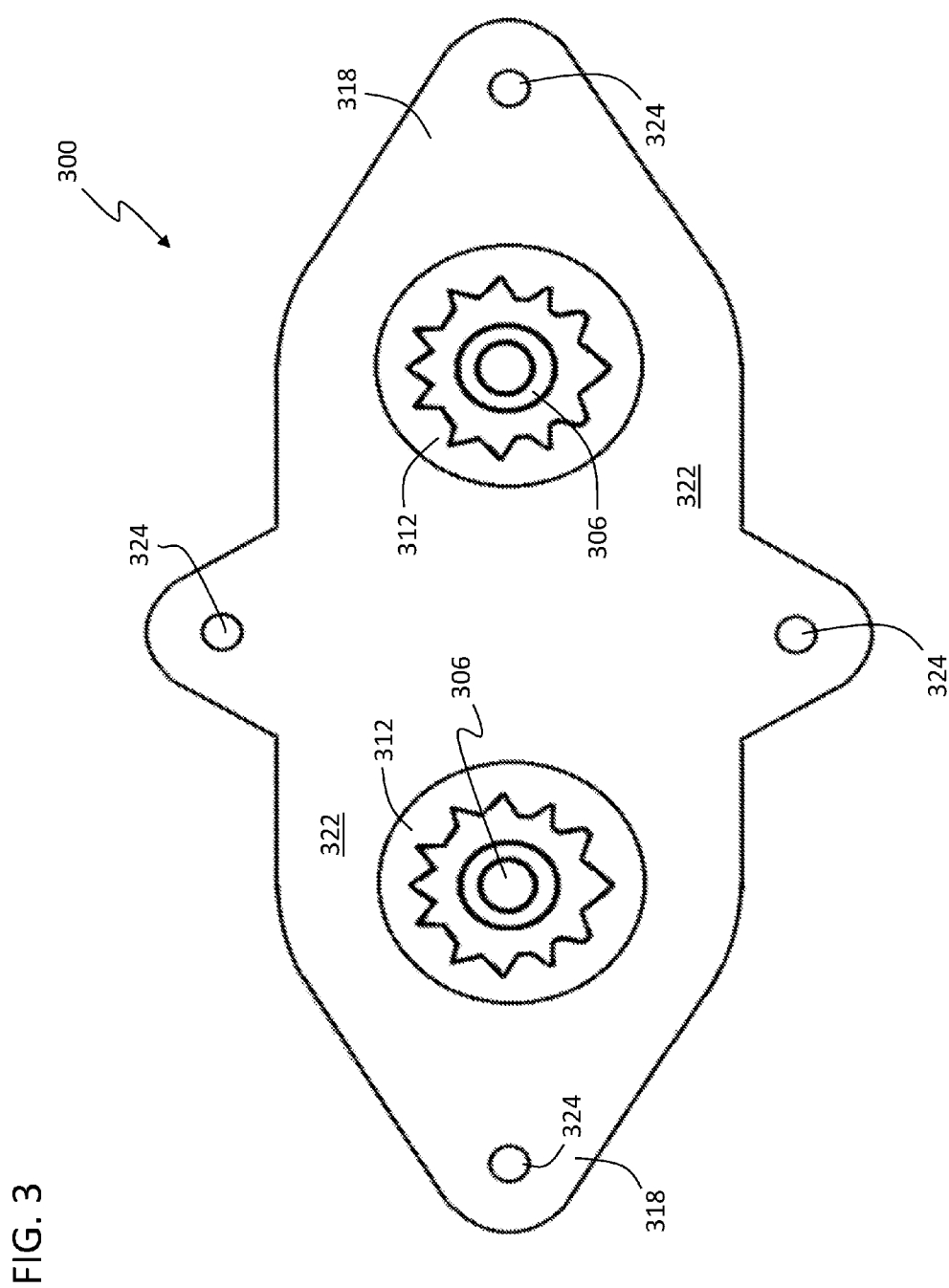
FIG. 3 is a schematic illustration of a sliding fastener system in accordance with an embodiment of the present disclosure.

Turning now to FIG. 3, an alternative configuration of a sliding fastener system 300 in accordance with an example embodiment of the present disclosure is shown. The sliding fastener system 300 is similar in function and operation as the sliding fastener system 100 of FIGS. 1A-1B. However, the sliding fastener system 300 of FIG. 3 includes a larger tray 318 that is configured to receive multiple fasteners 306 which are connected with respective locking elements 312. Further, as shown, the tray 318 can be fixedly connected or attached to a second component, as described above, by multiple tray fasteners 324. The locking elements 312 are configured to slide or otherwise move relative to a sliding surface 322 of the tray 318.

Although shown in FIG. 3 with two fastener 306/locking elements 312 pairs and four tray fasteners 324, those of skill in the art will appreciate that any number of fasteners, locking elements, or tray fasteners can be used without departing from the scope of the present disclosure. Further, although shown in FIG. 3 as a single tray, those of skill in the art will appreciate that any number of sliding fastener systems (or units) can be used without departing from the scope of the present disclosure.

Figure 4:
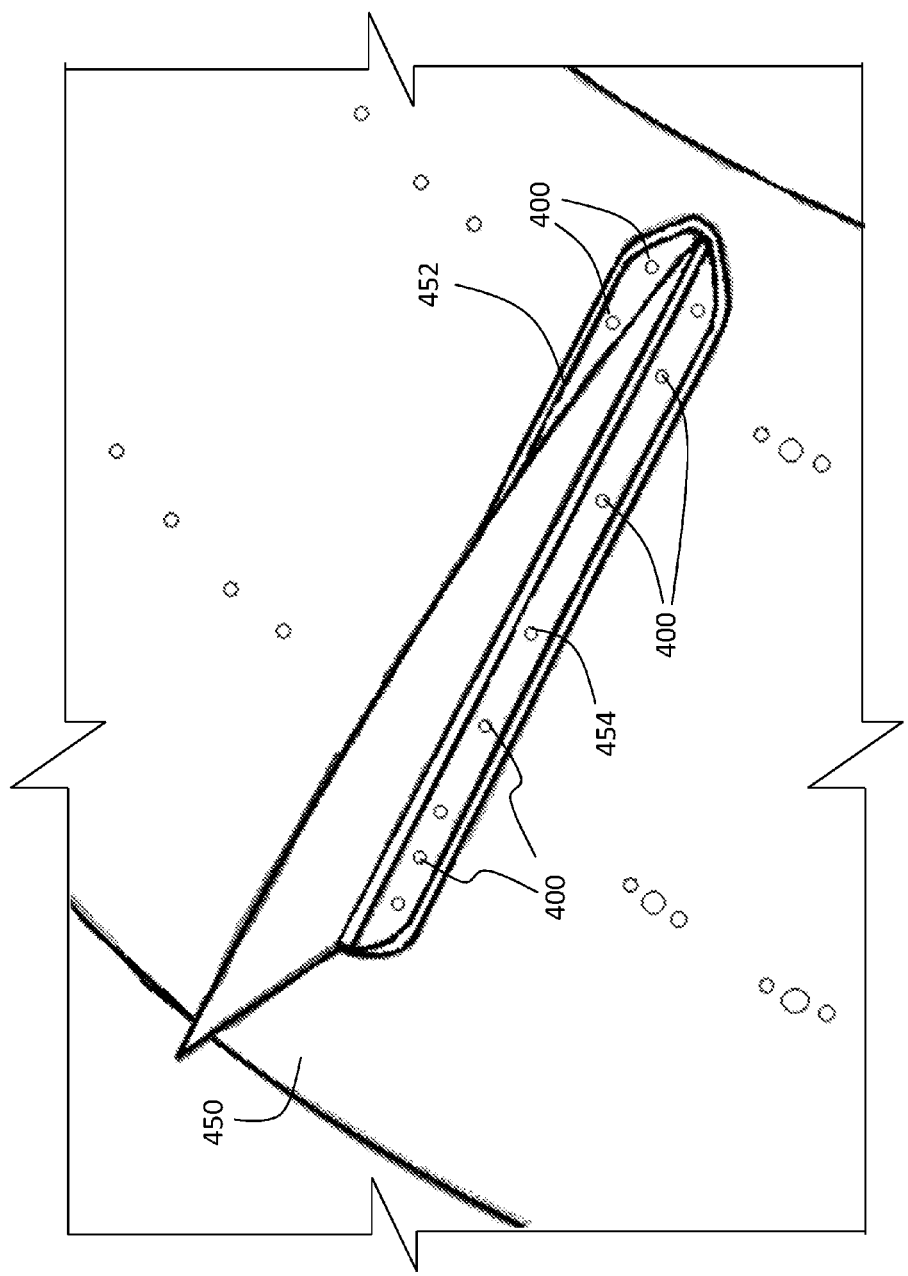
FIG. 4 is a schematic illustration of two components of a propulsion system that can be joined using embodiments of the present disclosure.

For example, turning now to FIG. 4, a nacelle 450 of an aircraft is shown having a strake 452. The strake 452 can be engaged to the nacelle 450 by a plurality of sliding fastener systems 400. In some embodiments, not all fasteners that fasten the strake 452 to the nacelle 450 need include a sliding fastener system as described herein. For example, in one non-limiting embodiment, a central fastener 454 that fastens the strake 452 to the nacelle 450 may be fixed without use of sliding fastener system 400. All other fasteners of the joining between the strake 452 and the nacelle 450 may be sliding fastener systems 400 in accordance with embodiments of the present disclosure.

As will be apparent to those of skill in the art, in accordance with various embodiments, sliding fastener systems as provided herein can be used when joining two or more components with two or more fasteners. The location and number of sliding fastener systems to be used in a joining of components may be dependent upon specific configurations, structural limitations, structural or safety requirements, etc.

Advantageously, embodiments described herein provide a fastening system for joining components of differing thermal expansion coefficients that is configured to enable thermal expansion and contraction of one or both of the components relative to the other without in-plane loads being too excessive for the components and/or the fastening system. Further, embodiments provided herein can enable the ability to dial-in or control a combination of torque and coefficient of friction that can result in an in-plane fastener load consistent with a fastener fatigue life requirement.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described with respect to a single joining of two components, those of skill in the art will appreciate that sliding fastener systems of the present disclosure can be used for various configurations of joined components. Further, although described with respect to an aluminum strake and composite shell of a component of an aircraft, those of skill in the art will appreciate that the sliding fastener systems of the present disclosure can be used for joining any two components that have different thermal expansion coefficients.

Accordingly, the present disclosure is not to be seen as limited by the foregoing description, but is only limited by the scope of the appended claims.

I claim:

1. A sliding fastener system comprising:
   a fastener configured to fixedly attach to a first component having a first thermal expansion coefficient;
   a tray configured to fixedly attach to a second component having a second thermal expansion coefficient different from the first thermal expansion coefficient, the tray defining a sliding surface; and
   a locking element having at least a portion configured to engage with the fastener, the locking element having a base with a contact surface that movably contacts the sliding surface of the tray when the tray, the fastener, and the locking element fasten the first component and the second component together,
   wherein the fastener and the locking element are configured to move with the first component and the tray is configured to move relative to the fastener and the locking element with the second component when there is a differential thermal expansion between the first and second components,
   wherein the contact surface of the base includes a friction reducing feature such that the base can move relative to the sliding surface.

2. The sliding fastener system of claim 1, further comprising two or more tray fasteners configured to fixedly attach the tray to the second component.

3. The sliding fastener system of claim 1, wherein the friction reducing feature is at least one of a material of the sliding surface, a material of the contact surface, a coating applied to the sliding surface, and a coating applied to the contact surface.

4. The sliding fastener system of claim 1, wherein the friction reducing feature is a curved contour of the base of the locking element.

5. The sliding fastener system of claim 1, wherein the tray includes a structural element that increases a structural rigidity of the tray.

6. The sliding fastener system of claim 5, wherein the structural element at least partly defines the sliding surface.

7. The sliding fastener system of claim 1,
   wherein the tray includes a tray aperture passing therethrough and configured to receive a portion of the fastener and the locking element includes a locking aperture passing therethrough, the locking aperture configured to engage with the fastener, and
   wherein the locking aperture has a smaller diameter than the tray aperture.

8. The sliding fastener system of claim 1, wherein the portion of the locking element configured to engage with the fastener is a stem.

9. The sliding fastener system of claim 8, wherein the stem is separable from the base.

10. A sliding fastener system comprising:
    a first component having a first thermal expansion coefficient;
    a second component having a second thermal expansion coefficient different from the first thermal expansion coefficient;
    a fastener configured to pass through the first component and the second component and fixedly contact the first component;
    a tray configured to fixedly attach to the second component, the tray defining a sliding surface; and
    a locking element having at least a portion configured to engage with the fastener, the locking element having a base with a contact surface that movably contacts the sliding surface of the tray when the tray, the fastener, and the locking element fasten the first component and the second component together,
    wherein the fastener and the locking element are configured to move with the first component and the tray is configured to move relative to the fastener and the locking element with the second component when there is a differential thermal expansion between the first and second components,
    wherein the contact surface of the base includes a friction reducing feature such that the base can move relative to the sliding surface.

11. The sliding fastener system of claim 10, wherein the first component is a strake of an aircraft propulsion system and the second component is a composite shell of a nacelle of the aircraft propulsion system.

12. The sliding fastener system of claim 10,
    wherein the second component includes a component aperture passing therethrough and configured to receive a portion of the fastener,
    wherein the tray includes a tray aperture passing therethrough and configured to receive a portion of the fastener, and
    wherein the tray aperture is a smaller diameter than the component aperture.

13. The sliding fastener system of claim 10, further comprising at least one tray fastener configured to fixedly attach the tray to the second component.

14. The sliding fastener system of claim 10, wherein the friction reducing feature is at least one of a material of the sliding surface, a material of the contact surface, a coating applied to the sliding surface, and a coating applied to the contact surface.

15. The sliding fastener system of claim 10, wherein the friction reducing feature is a curved contour of the base of the locking element.

16. The sliding fastener system of claim 10,
wherein the tray includes a tray aperture passing therethrough and configured to receive a portion of the fastener and the locking element includes a locking aperture, the locking aperture configured to engage with the fastener, and
wherein the locking aperture has a smaller diameter than the tray aperture.

17. The sliding fastener system of claim 10, wherein the tray includes a structural element that increases a structural rigidity of the tray.

18. The sliding fastener system of claim 17, wherein the structural element at least partly defines the sliding surface.

19. A sliding fastener system comprising:
a fastener configured to fixedly attach to a first component having a first thermal expansion coefficient;
a tray configured to fixedly attach to a second component having a second thermal expansion coefficient different from the first thermal expansion coefficient, the tray defining a sliding surface; and
a locking element having at least a portion configured to engage with the fastener, the locking element having a base with a contact surface that movably contacts the sliding surface of the tray when the tray, the fastener, and the locking element fasten the first component and the second component together,
wherein the fastener and the locking element are configured to move with the first component and the tray is configured to move relative to the fastener and the locking element with the second component when there is a differential thermal expansion between the first and second components,
wherein the tray includes a structural element that increases a structural rigidity of the tray.

20. The sliding fastener system of claim 19, wherein the structural element at least partly defines the sliding surface.

* * * * *